(12) United States Patent
Coe

(10) Patent No.: US 8,926,742 B2
(45) Date of Patent: Jan. 6, 2015

(54) ASPHALT-RUBBER COMPOSITIONS AND SYSTEMS AND METHODS FOR PREPARING SAME

(71) Applicant: William B. Coe, Wrightwood, CA (US)

(72) Inventor: William B. Coe, Wrightwood, CA (US)

( * ) Notice: Subject to any disclaimer, the term of this patent is extended or adjusted under 35 U.S.C. 154(b) by 0 days.

(21) Appl. No.: 14/335,808

(22) Filed: Jul. 18, 2014

(65) Prior Publication Data

US 2014/0329938 A1 Nov. 6, 2014

Related U.S. Application Data

(62) Division of application No. 12/649,276, filed on Dec. 29, 2009, now Pat. No. 8,808,445.

(60) Provisional application No. 61/141,389, filed on Dec. 30, 2008.

(51) Int. Cl.
| | | |
|---|---|---|
| *C08L 95/00* | (2006.01) | |
| *C09D 195/00* | (2006.01) | |
| *C09J 195/00* | (2006.01) | |

(52) U.S. Cl.
CPC ........... *C08L 95/005* (2013.01); *C09D 195/005* (2013.01); *C09J 195/005* (2013.01); *C08L 2555/60* (2013.01); *C08L 2555/80* (2013.01)
USPC .................. 106/277; 106/281.1; 106/284.01; 524/59; 524/60; 524/61; 524/62

(58) Field of Classification Search
USPC ......................................................... 106/277
See application file for complete search history.

(56) References Cited

U.S. PATENT DOCUMENTS

| | | |
|---|---|---|
| 3,262,951 A | 7/1966 | Katz |
| 3,284,388 A | 11/1966 | Stierli |
| 3,513,005 A | 5/1970 | Bradshaw et al. |
| 4,137,204 A | 1/1979 | McDonald |
| 4,478,642 A | 10/1984 | Schilling et al. |
| 4,588,634 A | 5/1986 | Pagen et al. |
| 4,722,953 A | 2/1988 | DeRuiter et al. |
| 5,674,313 A | 10/1997 | Aoyama et al. |
| 6,902,610 B2 | 6/2005 | Guerin et al. |
| 6,964,940 B1 | 11/2005 | Treybig et al. |
| 7,025,822 B2 | 4/2006 | Partanen et al. |
| 7,811,373 B2 | 10/2010 | Partanen et al. |
| 2002/0058734 A1 | 5/2002 | Harlan |
| 2003/0018106 A1 | 1/2003 | Sylvester |
| 2009/0176014 A1 | 7/2009 | Martin et al. |

FOREIGN PATENT DOCUMENTS

| | | |
|---|---|---|
| CA | 1136794 | 11/1982 |
| GB | 1167265 | 10/1969 |

OTHER PUBLICATIONS

International Search Report and Written Opinion for PCT/US2009/069757 filed Dec. 29, 2009, mailed on Sep. 10, 2010.
PG 58-22/58-28 asphalt binders flyer, 2012.
Heitzman, M.A., State of the Practice—Design and Construction of Asphalt Paving Materials with Crumb Rubber Modifier, FHWA-SA-92-022, Federal Highway Administration, Washington, D.C., 1992.
Putnam et al., "Crumb Rubber Modification of Binders: Interaction and Particle Effects", Road Materials and Pavement Design. vol. X—No. X/2006.
Shatnawi, S. White Paper entitled "Comparisons of Rubberized Asphalt Binders, Asphalt-Rubber and Terminal Blend" for the Rubber Pavements Association (2011).
U.S. Department of Transportation, Federal Highway Administration, "User Guidelines for Waste and Byproduct Materials in Pavement Construction", Asphalt Concrete (Dry Process); Publication No. FHWA-RD-97-148, downloaded on Apr. 2, 2013 at http://fhwa.dot.gov/publications/research/infrastructure/structures/97148/st3.cfm.
U.S. Department of Transportation, Federal Highway Administration, "User Guidelines for Waste and Byproduct Materials in Pavement Construction", Asphalt Concrete (Wet Process); Publication No. FHWA-RD-97-148, downloaded on Apr. 2, 2013 at http://fhwa.dot.gov/publications/research/infrastructure/structures/97148/st2.cfm.
Xiao et al., "Laboratory Investigation of Dimensional Changes of Crumb Rubber Reacting with Asphalt Binder", Road Materials and Pavement Design. vol. X—No. X/2006.
ASTM D977 Flyer, 1996.

*Primary Examiner* — Irina Krylova
(74) *Attorney, Agent, or Firm* — Knobbe Martens Olson & Bear

(57) ABSTRACT

One embodiment provides a process for preparing an asphalt-coated crumb rubber composition that meets the specification set forth in ASTM D80-02 or deviations thereof which may be established by the specifying agency from time to time. The process generally comprises obtaining asphalt of different penetration grades, combining the asphalt of each grade with preselected chemicals to form separate premixed components, blending the premixed components together under predetermined conditions to form, upon curing, an asphalt-coated crumb rubber composition that meets certain physical requirements for asphalt-rubber binder (ARB), such as those set forth in ASTM D8-02. Advantageously, the resulting asphalt-coated crumb rubber composition not only meets the physical requirements of ARB used in road paving but also has improved dispersion of the rubber, such as dispersion of the rubber in an oil-in-water emulsion of an asphalt.

15 Claims, 2 Drawing Sheets

US 8,926,742 B2

ASPHALT-RUBBER COMPOSITIONS AND SYSTEMS AND METHODS FOR PREPARING SAME

INCORPORATION BY REFERENCE TO RELATED APPLICATIONS

Any and all priority claims identified in the Application Data Sheet, or any correction thereto, are hereby incorporated by reference under 37 CFR 1.57. This application is a divisional of U.S. application Ser. No. 12/649,276 filed Dec. 29, 2009, which claims the benefit of U.S. Provisional Application No. 60/141,389 filed Dec. 30, 2008 and U.S. Provisional Application No. 61/142,847 filed Jan. 6, 2009. Each of the aforementioned applications is incorporated by reference herein in its entirety, and each is hereby expressly made a part of this specification.

BACKGROUND OF THE INVENTION

1. Field of the Invention

This invention generally relates to asphalt-rubber compositions and systems and methods for preparing same.

2. Description of the Related Art

Asphalt pavement suffers from oxidative hardening over time. This oxidative hardening causes cracking of the pavement, potholes, and loose gravel on the surface. The addition of rubber, such as crumb rubber from recycled automobile tires, to an asphalt binder, substantially reduces the rate of oxidative hardening of asphalt pavement and increases the useful life of a road. This asphalt-rubber mixture is typically referred to as asphalt-rubber binder (ARB).

ARB and aggregates are typically mixed together and spread onto road surfaces to form asphalt pavement. Because prior art ARB is highly temperature sensitive, it can be applied to roads only under certain surface temperature and weather conditions. This in turn limits road paving activities to only a few months of the year in most regions of the country. Additionally, special heating/blending equipment are often required at job sites to keep the mixture free flowing and homogeneous. In some cases, additives are added to asphalt-rubber hot mix material to reduce segregation, crusting, or lumping of the crumb rubber. These additives, however, could have detrimental effects on other properties of the mixture. Thus, there is a current need for an improved ARB system that is less sensitive to environmental conditions and can be easily applied to surfaces without requiring expensive or complex equipment or additives to keep the mixture free flowing and homogeneous.

SUMMARY OF THE INVENTION

The chemical compositions, methods, processes, and systems of the invention each have several aspects, no single one of which is solely responsible for its desirable attributes. Without limiting the scope of this invention, its more prominent features will now be discussed briefly. After consideration of this discussion and particularly after reading the section entitled "Detailed Description" one will understand how the features of this invention provide advantages that include, for example, a waterborne asphalt-rubber composition that is less temperature sensitive and can be easily applied to road surfaces.

Generally, the disclosure herein relates to methods of preparing emulsions of an asphalt-rubber binder, and compositions related to these methods. Emulsification of asphalt-rubber binder for pavement preservation systems has been considered by many as not achievable because of the difficulties in emulsifying a mixture containing crumb rubber and asphalt. For example, asphalt-rubber binder normally may not readily be emulsified because the rubber particles disrupt the laminar flow of the asphalt-rubber matrix during mixing in a colloidal mill. The present methods overcome these difficulties by pre-compounding the crumb rubber in a manner so as to facilitate dispersion in the final emulsion. In some embodiments, the pre-compounding may eliminate disruption of the laminar flow which may occur when emulsifying a binder by means of a colloidal mill. While not limiting any embodiment by theory, it is believed that during mixing, the pre-compounded crumb rubber moiety is substantially homogenized into the asphalt droplets of the asphalt emulsion, thus forming a smooth and uniform emulsion of asphalt-rubber binder.

In some embodiments, the present methods comprise immersing finely ground tire rubber in an asphalt to form a hot rubber adhesive. For example, some methods comprise immersing, under steady stirring, a finely ground tire rubber (crumb rubber), about 80-140 mesh, in a waterless, up to about 350° F. polymer modified asphalt, whereby the ground tire rubber swells and reacts thereby "coating" the individual crumb rubber moiety to form a hot rubber adhesive. The reacted hot rubber adhesive may then be compounded under high shear with an asphalt emulsion and can be formulated as a coating, sealing and/or adhesive. The resulting asphalt rubber emulsion will cure quickly to a non-tracking, water resistant asphalt rubber binder or surfacing element with superior resistance to oxidative hardening, weather or mechanical wear. It may also be formulated to cure at non-traditional winter temperatures down to 40 F and at night time. The resulting asphalt-rubber binder emulsion has improved adhesion, cohesion, early green strength, and water resistance when employed in ambient cured, structural waterproofing and pavement preservation systems.

Some of these methods comprise treating the crumb rubber with an asphalt composition to form an asphalt coated crumb rubber composition, and then mixing the asphalt coated crumb rubber composition with an asphalt emulsion to form an emulsified asphalt-rubber binder. A variety of asphalt emulsions may be used to provide emulsions of asphalt-rubber binder. For example, in some embodiments, an asphalt emulsion may be a product of mixing a first asphalt with water and a surfactant to form a first emulsion. With respect to the makeup of an asphalt emulsion, an asphalt emulsion may preferably comprise a first asphalt, a surfactant, and water.

A variety of asphalt-coated crumb rubber compositions may be used to provide emulsions of asphalt-rubber binder. For example, an asphalt-coated crumb rubber composition may be a product of mixing a plurality of crumb rubber particles with an effective amount of a second asphalt to coat the particles, wherein the second asphalt has caused the particles to swell. While the makeup of the asphalt-coated crumb rubber composition varies, one example may include a plurality of crumb rubber particles and a second asphalt, wherein the particles are substantially coated with the second asphalt, and the particles have swelled in the presence of the second asphalt.

Thus, one method for preparing an emulsion of an asphalt-rubber binder comprises: mixing a first asphalt emulsion with an asphalt-coated crumb rubber composition to provide an emulsion of an asphalt-rubber binder; wherein the first asphalt emulsion is a product of mixing a first asphalt with water and a surfactant to form a first asphalt emulsion; and wherein the asphalt-coated crumb rubber composition is a product of mixing a plurality of crumb rubber particles with an effective amount of a second asphalt to coat the particles, and wherein the second asphalt has caused the particles to swell.

Another aspect relates to a method for preparing an emulsion of an asphalt-rubber binder comprising: mixing a first asphalt emulsion with an asphalt-coated crumb rubber composition to provide an emulsion of an asphalt-rubber binder; wherein the first asphalt emulsion comprises a first asphalt, a surfactant, and water; and wherein the asphalt-coated crumb rubber composition comprises a plurality of crumb rubber particles and an effective amount of a second asphalt to coat the particles, the particles are substantially coated with the second asphalt, and the particles have swelled in the presence of the second asphalt.

Some methods for preparing an emulsion of an asphalt-rubber binder comprise: mixing a first asphalt with water and a first surfactant to form a first emulsion; mixing a plurality of crumb rubber particles with an effective amount of a second asphalt to coat the particles to provide an asphalt-coated crumb rubber composition, and allowing the particles to swell; and mixing the first asphalt emulsion with the asphalt-coated crumb rubber composition to provide an emulsion of an asphalt-rubber binder.

Some embodiments provide an emulsion of an asphalt-rubber binder prepared by a process described herein. Another aspect relates to an emulsion of an asphalt-rubber binder comprising: an asphalt; crumb rubber, representing about 30% to about 50% of the total weight of all non-volatile components of the emulsion, which has swollen in the presence of the asphalt; a cationic surfactant; and water; wherein the emulsion is stable at a pH below about 7.

Also provided is an asphalt emulsion comprising: an asphalt having a pen value of from about 0 dmm to about 30 dmm; an amido amine surfactant, an ammonium salt thereof, or a combination thereof; and water, representing about 30% to about 50% of the weight of the emulsion.

Some embodiments provide an asphalt-coated rubber composition comprising: an asphalt; crumb rubber; and an amount of a cationic surfactant which is effective to increase the hydrophilicity of the composition as compared to a composition which is identical except that it has no added cationic surfactant.

In one embodiment, the invention provides a process for preparing an asphalt-rubber composition that meets the definition for asphalt rubber binder set forth in ASTM D8-02 or deviations thereof which may be established by the specifying agency from time to time. In a preferred embodiment, this process provides an asphalt-rubber binder as an emulsion. The process generally comprises obtaining asphalt of different penetration grades, combining the asphalt of each grade with preselected chemicals to form separate premixed components, blending the premixed components together under predetermined conditions to form, upon curing, an asphalt-rubber composition that meets certain physical requirements for asphalt-rubber binder, such as those set forth in ASTM D8-02. Advantageously, the resulting asphalt-rubber composition not only meets the physical requirements of ARB used in road paving but also has improved dispersion of the rubber, such as dispersion of the rubber in an oil-in-water emulsion of an asphalt.

These asphalt-rubber compositions may also be used as a binder, coating, sealant, adhesive, or a combination thereof, and may be adapted for road paving, roofing, and other related applications. For example, in certain embodiments, an asphalt-rubber binder composition or and asphalt-rubber binder emulsion may be used as a HMA primer, SAMI primer, SAMI (stress absorbing membrane interlayer) chip binder, rejuvenating sealer, fog seal, skid resistant traffic lane sealant-surface binder, seal coat binder, ISSA (International Slurry Surfacing Association) Type I, Type II, or Type III Micro slurry binder, or cold mix adhesive inclusive of RAP, D1227 Type III B roof membrane, submerged membrane liner, flashing cement, steel or concrete pipe coating, waterproofing mastic(s), and the like, or a combination thereof.

In a preferred implementation, asphalt of three different penetration grades are selected, which includes a hard asphalt, preferably having a pen value of between about 0 dmm and about 50 dmm, or between about 0 dmm and about 90 dmm; a medium asphalt, preferably having a pen value of between about 90 dmm and about 200 dmm or between about 150 dmm and about 200 dmm; and a soft asphalt, preferably having a pen value of between about 200 dmm and about 300 dmm. The hard asphalt is preferably mixed with certain surfactants and water to form a hard pen asphalt emulsion. The soft asphalt is preferably modified by a polymer and then mixed with certain surfactants and water to form a soft pen-polymer modified asphalt emulsion. The medium asphalt is preferably mixed and reacted with crumb rubber at about 350° F. to form an asphalt-rubber blend and then combined with a certain surfactant and optionally water to form a mastic. The hard pen asphalt emulsion, soft pen-polymer modified asphalt emulsion, and mastic are then subsequently blended at different ratios to form a variety of waterborne asphalt-rubber composition(s). In one implementation, the hard pen asphalt emulsion and soft pen-polymer modified asphalt emulsion are first mixed together to form an emulsion pre-blend, which is subsequently blended with the mastic to provide a substantially homogeneous, free flowing waterborne asphalt-rubber emulsion blend that can be applied to road surfaces at various temperatures. The crumb rubber mastic may be dissolved or dispersed in any phase of the waterborne composition. For example, the rubber mastic may be a separate solid phase dispersed in the one or more liquid phases of the emulsion, the rubber mastic may be a separate liquid phase dispersed in one or more of the liquid phases of the emulsion, or the rubber mastic may be dissolved into one or more of the liquid phases of the emulsion. In certain preferred embodiments, the cured final compound conforms with the rubber/asphalt ratios prescribed by ASTM D6114-97 to provide a suitable asphalt-rubber binder for asphalt pavement. In another embodiment, this asphalt-rubber emulsion blend is mixed with aggregate at about 32° F. to about 100° F. or about 130° F. to provide an asphalt pavement. Some asphalt-rubber binder emulsions may be capable of curing during the winter or at night. For example, some asphalt-rubber binder emulsions may fully cure at temperatures as low as about 40° F. or about 32° F.

In another embodiment, the invention provides a waterborne asphalt-rubber binder composition. This composition may be used as a binder, coating, sealant, adhesive, or a combination thereof, and may be adapted for road paving, roofing, and other related applications. For example, in certain embodiments, an asphalt-rubber binder composition or and asphalt-rubber binder emulsion may be used as a HMA primer, SAMI primer, SAMI (stress absorbing membrane interlayer) chip binder, rejuvenating sealer, fog seal, skid resistant traffic lane sealant-surface binder, seal coat binder, ISSA (International Slurry Surfacing Association) Type I, Type II, or Type III Micro slurry binder, or cold mix adhesive inclusive of RAP, D1227 Type III B roof membrane, submerged membrane liner, flashing cement, steel or concrete pipe coating, waterproofing mastic(s), and the like, or a combination thereof. In one implementation, the composition comprises asphalt; crumb rubber; an epoxidized unsaturated triglyceride, a solvent dispersed wood rosin ester, a functional vegetable oil derivative, or a combination thereof; a surfactant, and optionally water. In another implementation, the composition consists essentially of: asphalt; crumb rubber; an epoxidized unsaturated triglyceride, a solvent dispersed wood rosin ester, a functional vegetable oil derivative, or a combination thereof; an unsaturated fatty acid; one or more surfactants; an optionally substituted styrene butadiene styrene block copolymer; one or more cross linking agents; and optionally water. In another implementation, the composition consists essentially of: asphalt; crumb rubber; an epoxidized unsaturated triglyceride, a solvent dispersed wood rosin ester, a functional vegetable oil derivative, or a combination thereof; an unsaturated fatty acid; one or more surfactants; an optionally substituted styrene butadiene styrene block copolymer; one or more cross linking agents; a glycol ether; and optionally water.

DETAILED DESCRIPTION

Figure 1:
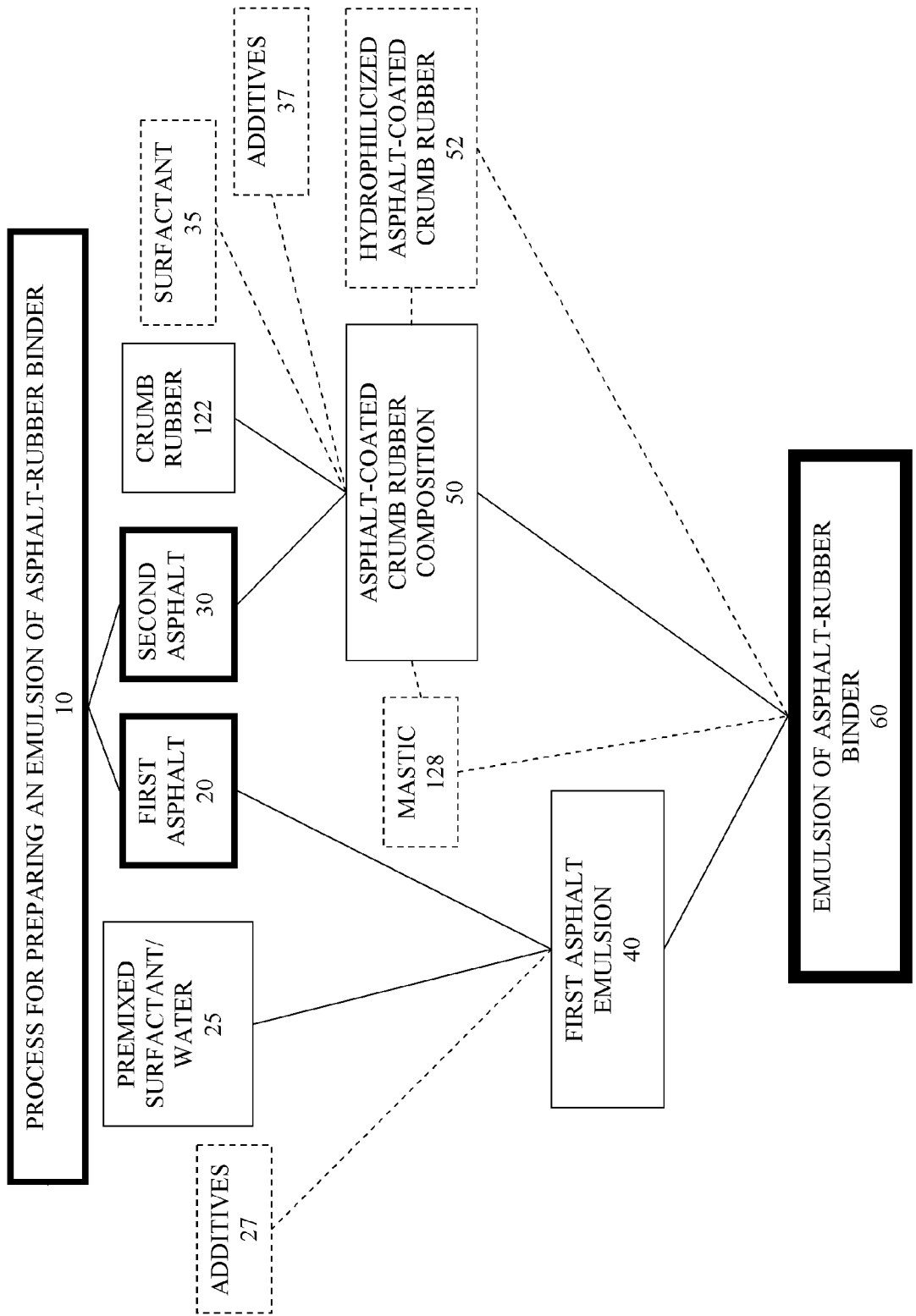
FIG. 1 is a flow chart depicting a process for preparing an emulsion of asphalt-rubber binder related to some embodiments.

FIG. 1 illustrates a process 10 for preparing an emulsion of asphalt-rubber binder. Generally, the process comprises selecting at least two different asphalts, or processing two separate quantities of the same asphalt or type of asphalt, emulsifying one asphalt and combining the other asphalt with crumb rubber, then recombining the compositions to provide the emulsion of asphalt-rubber binder.

With respect to FIG. 1, one of the asphalts is generally referred to as the "first asphalt" 20, and the other asphalt is generally referred to as the "second asphalt" 30, purely for convenience to avoid confusion when describing these processes. Other nomenclature may be employed either for convenience, or to provide a description related to a property of the asphalts.

In the process for preparing an emulsion of asphalt-rubber binder 10 of FIG. 1, a first asphalt 20 is combined with water and a surfactant, such as a premixed combination of surfactant and water 25, and optional additives 27, to provide a first asphalt emulsion 40. Preferably, the first asphalt 20 is about 50% (w/w) to about 70% (w/w), or about 60% (w/w) and the surfactant/water 25 is about 30% (w/w) to about 50% (w/w), or about 40% (w/w) of the first asphalt emulsion 40. The surfactant/water 25 is preferably separately prepared by blending water and the surfactant(s). In one implementation, the water is about 35% to about 40%, or about 37%, and the surfactant(s) are about 0.5% to about 4%, or about 2.2%, of the total weight of the first asphalt emulsion 40. In another implementation, the surfactant consists essentially of about 1.1% Prime Plex ER 582 surfactant and about 1.1% Indulin W-5 surfactant, based upon the weight of the emulsion.

The first asphalt 20 is preferably at a temperature between about 300° F. to about 350° F. at the time it is premixed with the surfactant/water 25, and the surfactant/water 25 is at a temperature between about 70° F. and about 90° F. In a preferred implementation, the mixing of the first asphalt 20 and the surfactant/water 25 is carried out at a rate such that the resulting emulsion is about 190° F. to about 210° F. after the mixing. In some embodiments, the asphalt and the surfactant/water may be mixed by co-milling through a colloid mill.

In a separate system or vessel, a second asphalt 30 is combined with crumb rubber 122, and optional components such as a surfactant 35 and/or additives 37, to provide an asphalt-coated crumb rubber composition 50. The asphalt-coated crumb rubber composition 50 comprises a plurality of crumb rubber particles 122 which are coated with the second asphalt 30. In some embodiments, an anhydrous surfactant 35 is added prior to, during, or after mixing the second asphalt 30 with the crumb rubber 122 without the addition of any water. However, the process may optionally be carried out without added water and without any added surfactant. Other additives 37 which may be included either before, after, or during the mixing of the second asphalt 30 and the crumb rubber 122 include fatty acids such as stearic acid, oleic acid, etc.; rosins such as wood rosin; high flash point organic solvents such as mineral spirits; additional surfactants, etc. In some embodiments, at least a portion of the mixing of the crumb rubber particles 122 and the second asphalt 30 occurs in the presence of stearic acid or oleic acid, a fatty amine surfactant, an ammonium salt of an amine surfactant, or a combination thereof. For some exemplary methods, at least a portion of the mixing of the crumb rubber particles 122 and the second asphalt 30 occurs in the presence of wood rosin, mineral spirits, a second surfactant, a third surfactant comprising an amine functional group, an ammonium salt, or a combination thereof.

The second asphalt 30 may in some instances be above ambient temperature when mixed with the crumb rubber 122. For example, the second asphalt 30 may be heated to from about 325° F. to about 375° F., or preferably about 350° F., and the crumb rubber 122 may be added to the second asphalt 30.

While there are a number of different types of asphalt-coated crumb rubber compositions 50, two types of an asphalt-coated crumb rubber compositions include a mastic 128 and a hydrophilicized asphalt coated crumb rubber 52.

For a hydrophilicized asphalt-coated crumb rubber 52, the crumb rubber particles 122 may be about 60% to about 90% of the total weight of all non-volatile components of the composition. Preferably, the second asphalt 30 is about 25% and the crumb rubber 122 is about 75% of the weight of the hydrophilicized asphalt-coated crumb rubber 52. Non-volatile components include those that do not significantly evaporate during the in-situ curing process of the final adhesive. In some embodiments, the hydrophilicized asphalt coated crumb rubber 52 may be prepared by spraying hot second asphalt 30 onto the surface of crumb rubber 122, then stirring the coated rubber within a heated blending vessel until sufficient swelling of the crumb rubber occurs. A surfactant 35 or other additives 37 may be added to second asphalt 30 before it is sprayed onto the crumb rubber 122, or they may be added after the asphalt 30 is added.

For the mastic 128, the second asphalt 30 may be about 60% to about 80%, and the crumb rubber particles 122 may be about 20% to about 40% of the total weight of all non-volatile components of the composition. Preferably, the second asphalt 30 is about 60% and the crumb rubber 122 is about 30%, or the asphalt is about 75% and the crumb rubber is about 25%, of the weight of the mastic 128. In another implementation, the crumb rubber particles 122 have a diameter from about 650 microns (μm) to about 75 μm.

In some embodiments, the mastic 128 comprises about 60.5% (w/w) second asphalt 30, about 30% (w/w) crumb rubber 122, about 4% (w/w) epoxidized soy oil, about 4% (w/w) water, and about 1.5% surfactant. In other embodiments the mastic 128 consists essentially of about 60.5% (w/w) second asphalt 30, about 30% (w/w) crumb rubber 122, about 4% (w/w) epoxidized soy oil, about 4% (w/w) water, and about 1.5% surfactant. In another embodiment the mastic 128 consists essentially of about 60.5% (w/w) second asphalt 30, about 30% (w/w) crumb rubber 122, about 4% (w/w) epoxidized soy oil, about 4% (w/w) water and/or glycol ether, and about 1.5% surfactant. In still another embodiment, the mastic 128 consists essentially of about 55% (w/w) medium asphalt, about 30% (w/w) crumb rubber 122, about 11% (w/w) high flash point solvent dissolved wood rosin ester, about 2.5% (w/w) water, and about 1.5% (w/w) surfactant. In some embodiments, addition of volatile components to the mastic are sequential. For example, the initial asphalt crumb rubber reaction may occur at a high temperature (325-375° F.). After the high temperature reaction, the mixture may then be allowed to cool to below flash point of subsequent additives so that additives can be blended into the mixture.

The first asphalt emulsion 40 may be combined with the asphalt-coated crumb rubber composition 50, such as a mastic 128 or a hydrophilicized asphalt-coated crumb rubber 52, to provide an emulsion of asphalt-rubber binder 60. In some embodiments, asphalt emulsion 40 may be combined with the asphalt-coated crumb rubber composition 50 under high speed shear until the mixture is fully homogeneous.

Some of these processes may further comprise mixing a third asphalt, with a polymer to provide a polymer modified asphalt; mixing the polymer modified asphalt with water and a fourth surfactant to provide a second asphalt emulsion; and mixing the second asphalt emulsion with at least one of the first asphalt emulsion, the asphalt-coated crumb rubber composition, and the emulsion of the asphalt-rubber binder. In some embodiments, the third asphalt may be softer than the first asphalt.

Figure 2:
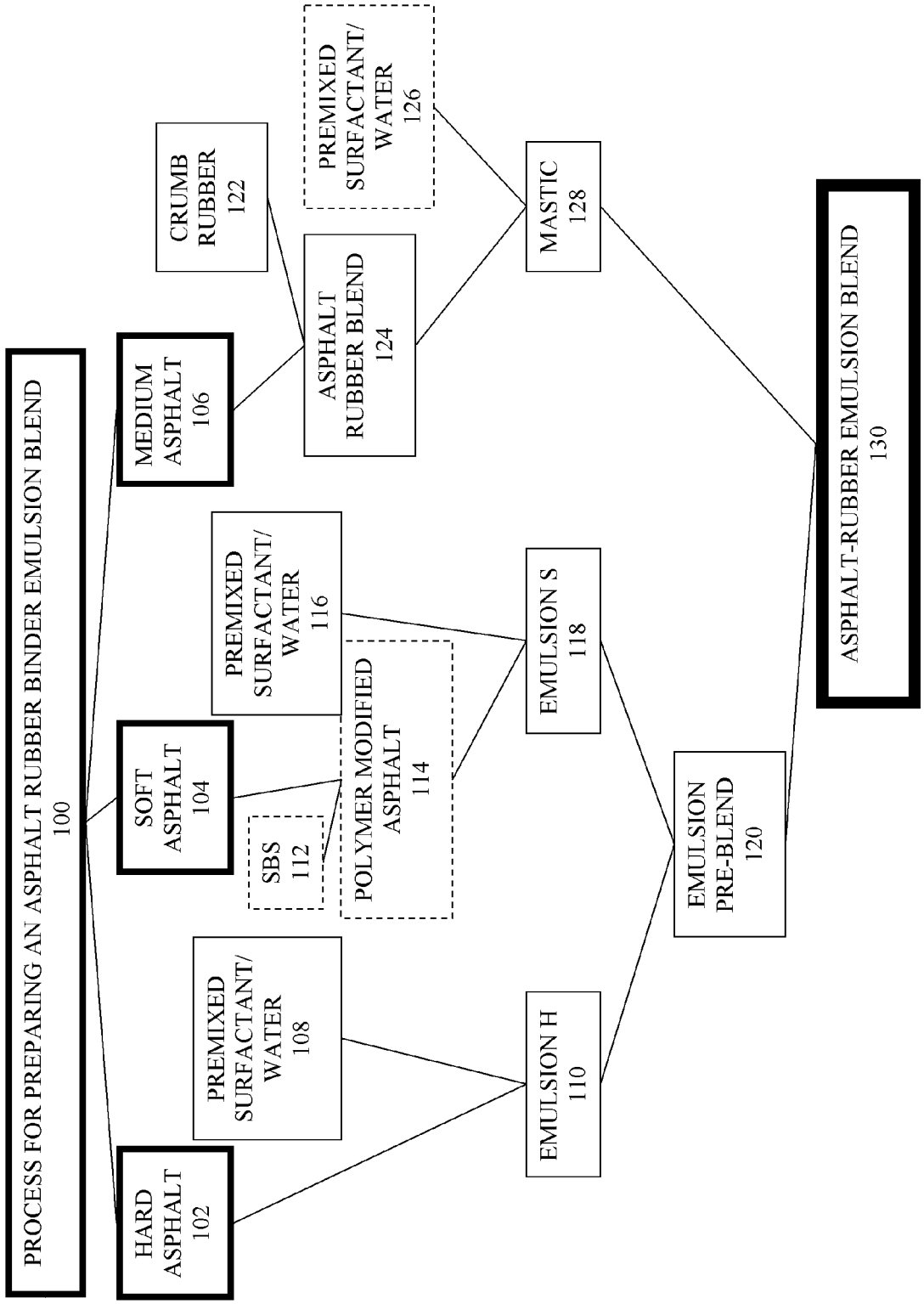
FIG. 2 is a flow chart depicting a process for preparing an asphalt-rubber binder emulsion blend related to some embodiments.

FIG. 2 illustrates a process 100 for preparing an asphalt-rubber binder system which follows the basic process of the process outlined in FIG. 1, but includes additional steps. This process also utilizes a third asphalt which has a different hardness than the first asphalt and the second asphalt. For example, in these processes the first asphalt is referred to as "hard asphalt," the second asphalt is referred to as "medium asphalt," and a third asphalt is referred to as "soft asphalt." The process 100 generally comprises selecting asphalt of different penetration grades, mixing each grade of asphalt separately with chemicals to form a plurality of premixed feedstock configured with different properties, and then combining the premixed feedstock to form an asphalt-rubber composition that upon curing, would exhibit physical properties equivalent to the asphalt-rubber binder(s) prepared pursuant to ASTM D6114-97 (2002) or deviations thereof which may be established by the specifying agency from time to time.

In processes depicted in FIG. 2, the process begins by providing a hard asphalt 102, preferably having a pen value of between about 0 dmm and about 50 dmm, or between about 0 dmm and about 90 dmm; a soft asphalt 104, preferably having a pen value of between about 90 dmm and about 300 dmm, or about 200 dmm and about 300 dmm; a medium asphalt 106, having a pen value of between about 150 dmm and about 200 dmm.

In one embodiment, the process 100 comprises premixing the hard asphalt 102 with a surfactant/water 108 or a soap system, to form emulsion H 110. Preferably, the hard asphalt 102 is about 61% (w/w) and the surfactant/water 108 is about 39% (w/w) of emulsion H 110. The surfactant/water 108 is preferably separately prepared by blending water and the surfactant(s). In one implementation, the water is about 37% and the surfactant(s) are about 2.2% of the total weight of emulsion H 110. In another implementation, the surfactant consists essentially of about 1.1% Prime Plex ER 582 surfactant and about 1.1% Indulin W-5 surfactant.

The hard asphalt 102 is preferably at a temperature between about 300° F. to about 350° F. at the time it is premixed with the surfactant/water 108, and the surfactant/water 108 is at a temperature between about 70° F. and about 90° F. In a preferred implementation, the mixing of the hard asphalt 102 and the surfactant/water 108 is carried out at a rate such that the resulting emulsion is about 190° F. to about 210° F. after the mixing. The asphalt and the surfactant/water are mixed by co-milling through a colloid mill.

In one embodiment, the process 100 further comprises premixing the soft asphalt 104 with a surfactant/water 116 or soap system, to form emulsion H 118. Alternatively, in another embodiment, the soft asphalt 104 is first blended, preferably at about 350° F., with an optionally substituted styrene butadiene styrene block copolymer (SBS) elastomer 112 to form a polymer modified asphalt 114. This polymer modified asphalt 114 is then blended with the surfactant/water 116 through a colloid mill to form emulsion S 118.

In one implementation, the soft asphalt 104 or the polymer modified asphalt 114 is about 61%, and the surfactant/water 116 is about 39%, of the total weight of emulsion S 118. The surfactant/water may comprise about 37% water and about 2% surfactant with respect to the total weight of emulsion S 118. In one embodiment, the surfactant consists essentially of about 1.1% (w/w of 118) Prime Plex ER 582 surfactant and about 1.1% (w/w of 118) Indulin W-5 surfactant.

The soft asphalt or the polymer modified asphalt may comprise an ammendment such as an unsaturated fatty acid, including an olefin from the stearol family. In one embodiment, the polymer modified asphalt consists essentially of 58% (w/w of 118) soft asphalt, 1.22% (w/w of 118) ammendment, and 2% (w/w of 118) SBS elastomer. In another embodiment, the asphalt and the ammendment are blended at 325° F., and the SBS is added and the mixture is run through high shear until the SBS is dissolved.

In one implementation, the soft asphalt 104 or polymer modified asphalt 114 is at a temperature between about 300° F. to about 350° F. at the time it is premixed with the surfactant/water 108, which is at a temperature between about 70° F. and about 90° F. In another implementation, the mixing of the soft asphalt 104 and the surfactant/water 116 is carried out at a rate such that the resulting emulsion is about 190° F. to about 210° F. after the mixing. In another implementation, after the initial combination of the soft asphalt 104 and the surfactant/water 116 are initially combined, additional mixing occurs over a period of from 1 hour to about 4 hours. In another implementation, the asphalt and the surfactant/water are co-milled through a colloid mill. After the soft asphalt emulsion is formed in the colloid mill, it may be stirred while it dissipates energy to a temperature of 175° F. or lower during storage.

In another embodiment, the process 100 further comprises premixing the medium asphalt 106 with the crumb rubber 122 to form an asphalt-rubber blend 124. In some embodiments, the asphalt-rubber blend is combined with surfactant/water 126, or a soap system, to provide a mastic 128. Alternatively, a surfactant is added prior to, during, or after the mixing the medium asphalt 106 with the crumb rubber 122 without adding any water. However, in some embodiments, neither water nor surfactant is added. In one implementation, the medium asphalt 106 is heated to from about 325° F. to about 375° F., and the crumb rubber 122 is added to the asphalt. In another implementation, the medium asphalt 106 is heated to about 350° F. and the crumb rubber 122 is added to the asphalt. In another implementation, once the crumb rubber 122 is added, the medium asphalt 106 and the crumb rubber 122 are mixed for about 15 minutes until the proper viscosity is achieved as required by D6114 Table 1 to provide the asphalt-rubber blend 124. Preferably, the viscosity is from about 900 to about 1500 cps. In one implementation, the asphalt is about 60% and the crumb rubber is about 30%, or the asphalt is about 75% and the crumb rubber is about 25%, of the weight of the mastic 128. In another implementation, the crumb rubber particles have a diameter from about 650 microns (μm) to about 75 μm.

In some embodiments, the surfactant/water 126, or soap system, is separately prepared by mixing the water and surfactant(s). In one embodiment, the water is about 4% and the surfactant(s) are about 1.5% of the weight of the mastic 128. In another embodiment, the asphalt-rubber blend 124 is then cooled to a temperature of from about 180° F. to about 210° F., and the ammendment and the surfactant/water are thoroughly blended in to provide a heavy mastic body consistency.

In some embodiments, the mastic 128 comprises about 60.5% (w/w) medium asphalt 106, about 30% (w/w) crumb rubber 122, about 4% (w/w) epoxidized soy oil, about 4% (w/w) water, and about 1.5% surfactant. In other embodiments the mastic 128 consists essentially of about 60.5% (w/w) medium asphalt 106, about 30% (w/w) crumb rubber 122, about 4% (w/w) epoxidized soy oil, about 4% (w/w) water, and about 1.5% surfactant. In another embodiment the mastic 128 consists essentially of about 60.5% (w/w) medium asphalt 106, about 30% (w/w) crumb rubber 122, about 4% (w/w) epoxidized soy oil, about 4% (w/w) water and/or glycol ether, and about 1.5% surfactant. In still another embodiment, the mastic 128 consists essentially of about 55% (w/w) medium asphalt, about 30% (w/w) crumb rubber 122, about 11% (w/w) high flash point solvent dissolved wood rosin ester, about 2.5% (w/w) water, and about 1.5% (w/w) surfactant.

In some embodiments, Emusion H 110 and Emulsion S 118 are then blended to provide the Emulsion Pre-Blend 120. The mastic 128 is then blended in under high speed shear until the mixture is fully homogeneous to provide the asphalt-rubber emulsion blend 130. In another embodiment, a crosslinker is added during the blending of Emulsion H 110 and Emulsion S 118 to provide an asphalt adhesive or pavement with a crosslinked asphalt-rubber binder. In another embodiment, a crosslinker is added during the blending of the Emusion pre-blend 120 and the mastic 128 to provide an adhesive or asphalt pavement with a crosslinked asphalt-rubber binder.

In some embodiments the asphalt pavement prepared using the compositions and methods described herein comprises asphalt-rubber binder which upon curing, will be equivalent to the physical properties of asphalt-rubber binder prepared pursuant to ASTM D6114-97 specifications.

As used herein, the term "asphalt" is a broad term and shall have its ordinary meaning and shall include, but not be limited to, a dark brown to black cementitious material in which the predominating constituents are bitumens which occur in nature or are obtained in petroleum processing.

Bitumen is a class of black or dark-colored (solid, semi-solid, or viscous) cementitious substances, natural or manufactured, composed principally of high molecular weight hydrocarbons.

As used herein, the term "surfactant" is a broad term and shall have its ordinary meaning and shall include, but not be limited to, a compound or mixture of compounds having both one or more hydrophobic or lipophilic moieties and one or more hydrophilic moieties in a single molecule. A surfactant may be nonionic, anionic, cationic, or amphoteric. Depending on factors such as pH, a given surfactant may belong to more than one of these classes.

Nonionic surfactants have no formal charge on the molecules. Non-limiting examples of nonionic surfactants include: alkylphenol ethoxylates, such as nonylphenol ethoxylates or octylphenol ethoxylates, comprising 30 to 100 ethylene oxide units; $C_{8-18}$ ethoxylated alcohols, including ethoxylated linear or branched alcohols such as ethoxylated fatty alcohols, etc. comprising from 1 to about 10, to about 20, to about 30 or to about 50 ethylene oxide units; $C_{8-18}$ ethoxylated carboxylic acids, including ethoxylated linear or branched carboxylic acids such as ethoxylated fatty acids, comprising from 1 to about 10, to about 20, to about 30 or to about 50 ethylene oxide units; $C_{8-18}$ ethoxylated carboxylic acid alkyl esters, including ethoxylated linear or branched carboxylic acid alkyl esters, e.g. ethoxylated fatty acid alkyl esters such as ethoxylated fatty acid methyl esters, comprising from 1 to about 10, to about 20, to about 30 or to about 50 ethylene oxide units; ethylene oxide based copolymers and block copolymers such as ethylene oxide propylene oxide copolymers, ethylene oxide propylene oxide block copolymers, and the like, having an average molecular weight in the range of about 1,000 to about 10,000; ethoxylated amines, including ethoxylated fatty amines such as tallow amines, containing about 5 to about 10, to about 20, to about 30, or to about 50 ethylene oxide units; ethoxylated diamines, including ethoxylated fatty diamines such as tallow diamines, containing about 5 to about 10, to about 20, to about 30, or to about 50 ethylene oxide units; and combinations thereof.

An amine surfactant is any surfactant containing an amine moiety or functional group. An amine moiety has two forms or subsets. In the first subset, or the neutral form, a nitrogen atom is directly attached to 3 independent atoms selected from carbon and hydrogen. In the ammonium or ammonium salt form, or ammonium functional group, a nitrogen atom is directly attached to 4 independent atoms selected from carbon and hydrogen and carries a positive formal charge. If the ammonium includes nitrogen attached to a hydrogen, it is readily converted to the neutral form if the pH is sufficiently high.

Fatty amines are nonionic surfactants if the pH is sufficiently high (i.e. basic) to keep the nitrogen atoms deprotonated so that they are in the neutral form. A fatty amine is nitrogen attached to three moieties independently selected from: H or a hydrocarbon. In some embodiments, the nitrogen is attached to H or $C_{8-22}$ hydrocarbon that is either unsaturated (i.e. alkyl) or has 1, 2, 3, 4, 5, 6, 7, or 8 double bonds. Examples include, but are not limited to: tallow amine, tallow diamine, soy diamine, tall oil diamine, tallow triamine, tallow tetramine, oleyl diamine, coco diamine, linear $C_{8-18}$ petroleum-derived diamine, branched $C_{8-18}$ petroleum-derived diamine, linear $C_{12-18}$ alkylether diamine, branched $C_{12-18}$ alkylether diamine, combinations thereof, and the like.

Other nitrogen containing surfactants such as amidoamines, imidazolines, imidoamines, imines, amidoamines, amides, imadazoles, imidazolene, and the like, also have neutral and cationic forms analogous to amines. These nitrogen containing surfactants are nonionic surfactants provided that the pH is sufficiently high (i.e. basic).

Anionic surfactants have one or more negative formal charges on the molecules. Examples include: $C_{6-30}$ carboxylic acids, including but not limited to, linear and branched carboxylic acids, which include fatty acids such as arachidic acid, arachidonic acid, behenic acid, eicosapentaenoic acid, linoleic acid, α-linolenic acid, γ-linolenic acid, myristic acid, lauric acid, oleic acid, palmitic acid, palmitoleic acid, stearic acid, and the like; $C_{6-30}$ carboxylic acid sulfonates, including but not limited to, sulfonates of any of the carboxylic acids listed above; $C_{6-30}$ alkyl sulfates; $C_{6-30}$ alkylbenzene sulfonates; alkylphenol ethoxylate sulfonates; etc.

Cationic surfactants have one or more positive formal charges on the molecules. Fatty amines such as those described above are cationic if they are in the ammonium form due to sufficiently low pH (i.e. acidic conditions) or the fact that the nitrogen is attached to 4 carbon atoms. Nitrogen compounds such as amines or ammonium salts, amidoamines, imidazolines, imidoamines, imines, amidoamines, amides, imadazoles, imidazolene, and the like, are also cationic surfactants provided that the pH is sufficiently low, or the nitrogen is quaternary, meaning that it is attached to 4 non-hydrogen atoms.

Amphoteric surfactants have either a positive or a negative formal charge depending on the pH of the composition. Sulfobetaines are an example.

In other embodiments, the surfactant is combined with lignin. Lignin is a polymeric substance containing a hydroxy phenyl propane backbone. It is found in plant and vegetable tissue associated with cellulose or other plant constituents. In the pulp and paper industry, lignin-containing material such as wood, straw, corn stalks bagasse and other suitable plant tissue may be processed to recover the cellulose and pulp. The residual pulping liquors are the main sources of technical lignins. In some embodiments, useful examples of lignins include kraft soft wood lignin, kraft hardwood lignin, bagasse lignin, organosol lignin, desulfonated lignosulfonate, and combinations thereof. In some embodiments, the surfactant comprises a nitrogen containing surfactant or an amine and lignin.

As used herein, the term "ammendment" is a broad term and shall have its ordinary meaning and shall include, plant derived resinous substances which beneficially augment the adhesive, cohesive, and solubility parameters of asphalt. Examples include functional vegetable oil derivatives and unsaturated carboxylic acids.

Emulsion of Asphalt-Rubber Binder

Mixing the first asphalt emulsion with the asphalt-coated crumb rubber composition provides an emulsion of an asphalt rubber-binder. While these compositions may vary considerably, the emulsion of an asphalt-rubber binder may comprise an asphalt, crumb rubber which has swollen in the presence of asphalt, a surfactant such as a cationic surfactant, and water. Preferably, the crumb rubber is about 15% to about 45%, or about 30% to about 45-% of the total weight of all non-volatile components of the emulsion. In some embodiments, the pH should be below about 7, or about 2 to about 6.

One type of emulsion of asphalt-rubber binder is obtained from three separate asphalt compositions: an asphalt-rubber composition, a hard asphalt emulsion, and a soft asphalt emulsion, which may be combined into a single composition to provide an asphalt-rubber emulsion blend. While each of these separate asphalt compositions may vary considerably, the asphalt-coated crumb rubber composition may comprise medium hardness asphalt, crumb rubber, a surfactant, and water; the hard asphalt emulsion may comprise hard asphalt, a surfactant, and water; and the soft asphalt emulsion may comprise soft asphalt, a surfactant; and water. Each of these three compositions is described in more detail in later sections of this disclosure.

The amounts of the different asphalt compositions in the emulsion blend may vary depending upon the circumstances. For example, while not intending to be limiting, the amount of the asphalt-rubber composition may be from about 25% (w/w) to about 50% (w/w) or preferably from about 30% (w/w) to about 40% (w/w); the amount of hard asphalt emulsion may be from about 30% (w/w) to about 60% (w/w) or preferably from about 40% (w/w) to about 50% (w/w); and the amount of soft asphalt emulsion may be from about to about 10% (w/w) to about 30% (w/w) or preferably from about 15% (w/w) to about 25% (w/w).

The manner of blending the three emulsions may vary. In one non-limiting example, the emulsion blend may be prepared by thoroughly blending a hard asphalt emulsion and a soft asphalt emulsion, followed by blending in an asphalt-coated crumb rubber composition. In some embodiments, the asphalt-coated crumb rubber composition is blended in under high shear until the mixture is fully homogeneous. Each of: the hard asphalt emulsion, the soft asphalt emulsion, and the asphalt-coated crumb rubber composition used in the emulsion blend may be prepared by any of the methods described herein.

In a preferred embodiment, the emulsion of asphalt-rubber binder comprises: asphalt, crumb rubber, an epoxidized unsaturated triglyceride, a surfactant, and water; wherein the composition conforms to ASTM International Standard Specification for Asphalt-Rubber binder.

A crosslinker may be present in an emulsion of asphalt rubber binder. The crosslinker may be present because it was part of an asphalt emulsion, an asphalt-coated rubber composition, or another optional component incorporated into the final emulsion. For example, the crosslinker could be part of a soft asphalt emulsion described in FIG. 2, which is incorporated into the blend. Alternatively, the emulsion of asphalt-rubber binder may further comprise a crosslinker which is not present in any of the asphalt components combined to form the final emulsion. Or one of the asphalt components combined to prepare the emulsion, such as the soft asphalt emulsion, may contain a crosslinker, and an additional amount of a crosslinker may be added to the final emulsion. The crosslinker may be added at any point during the blending of the asphalt compositions; and it may be useful in providing an asphalt pavement with a crosslinked asphalt-rubber binder.

The crosslinker may be any of the many crosslinkers known in the art, including those that work by an anionic, cationic, or free radical mechanism. In some embodiments, the crosslinker is sulfur or a sulfur compound, such as a thiol, thioether, disulfide, or the like. Preferably, the crosslinker comprises from 0 to 1000 carbon atoms and from 1 to 1000 sulfur atoms. In one embodiment, the crosslinker is an anionic crosslinker. Some non-limiting examples of useful anionic crosslinkers in are those comprising one or more functional groups independently selected from $-CR_2-O^-$, $-CR_2-S^-$, $-CR_2-CR_2^-$, and $-CR_2-NR^-$, wherein each R is independently H, a hydrocarbon, or an additional bond which forms $=C$.

While not intending to be limiting, the emulsion of asphalt-rubber binder may be used to prepare an asphalt pavement at ambient temperatures by a process comprising mixing the emulsion blend with aggregate and allowing the mixture to dry. In one embodiment, the dry asphalt-rubber binder in the asphalt pavement comprises from about 15% (w/w) to about 50% (w/w), about 4% to about 12%, about 12% (w/w) to about 22% (w/w), or about 15% (w/w) to about 22% (w/w) of crumb rubber.

In some embodiments, the emulsion blend may be cationic or anionic. For some cationic emulsions, the pH may be from about 2.5 to about 4.5. For some anionic emulsions, the pH may be from about 8 to about 10.

The compositions and methods described herein may provide improvement in a variety of asphalt emulsion characteristics. For example, some compositions or methods may provide improved adhesion, cohesion, early green strength, and/or water resistance when employed in a variety of asphalt systems such as ambient cured, structural waterproofing and pavement preservation systems. These emulsions may also provide, inter alia, improved performance for asphalt pavement and other applications, such as resistance to oxidative hardening or oxidative embrittlement, resistance to weather or mechanical wear, improvement in pavement life, improved load distribution between aggregate and binder, improved skid resistance, and the like.

Another use of some of the emulsions described herein may be as a street or highway seal. For example, the seal may stabilize and/or repair raveling and micro-fissure(s), interrupt progressive oxidative embrittlement, reverse diminished surface friction, or reduce tire noise.

Some emulsions described herein may also be used as a parking lot seal, for the maintenance of pavement in parking areas and, with appropriate aggregate, low speed traffic surfaces. For example, the seal may restore pavement surface profile, interrupt progressive oxidative embrittlement, create a fuel resistant barrier, eliminate tracking, extend the repaving cycle, reduce tire noise, or re-establish diminished surface friction.

Asphalt-Coated Crumb Rubber Compositions

The asphalt-coated crumb rubber compositions may comprise a second asphalt, and crumb rubber, and optionally, a surfactant. For some asphalt-coated crumb rubber compositions, such as hydrophilicized asphalt-coated crumb rubber, the crumb rubber may about 60% to about 80% of the weight of all non-volatile components of the asphalt-coated rubber composition. For other asphalt-coated crumb rubber compositions, such as mastics, the crumb rubber may be about 20% to about 40% of the weight of all non-volatile components of the asphalt-coated rubber composition. The asphalt-coated crumb rubber compositions may comprise asphalt (such as medium hardness asphalt), crumb rubber, a surfactant, and optionally water. In some embodiments, the asphalt-coated crumb rubber compositions may comprise asphalt (such as medium hardness asphalt), crumb rubber, a surfactant, and no added water, or alternatively, less than about 2% (w/w) water, about 1.5% (w/w) water, about 1% (w/w) water, about 0.5% (w/w) water, about 0.1% (w/w) water, or about 0.01% (w/w) water. While not intending to be limiting, the asphalt-coated crumb rubber compositions may further comprise an ammendment such as a functional vegetable oil derivative.

The amount of the second asphalt may vary depending upon the circumstances. In some embodiments, the medium hardness asphalt is from about 40% (w/w) to about 80% (w/w), from about 50% (w/w) to about 70% (w/w), or about 60% (w/w) of the asphalt-coated crumb rubber composition.

In some embodiments, the second asphalt may be softer than the first asphalt. For example, the second asphalt may be a medium asphalt. Medium hardness asphalt refers to asphalt having a hardness which may be suitable for use on an asphalt pavement road. In a preferred embodiment, the medium hardness asphalt has a penetration value according to ASTM D5 of from about 50 dmm, about 100 dmm, or from about 150 dmm, to about 200 dmm. Alternatively, the medium hardness asphalt has a ring and ball softening point according to ASTM D36 of from about 85° F. to about 100° F. With regard to chemical composition, the medium hardness asphalt may comprise $C_{8-24}$ hydrocarbons. For example, while not intending to be limiting, the hydrocarbon portion of the medium hardness asphalt may consist essentially of $C_{8-24}$ hydrocarbons.

Crumb rubber can be ground tire rubber, including ground recycled tire rubber. For example, the crumb rubber may be ground recycled tire rubber which contains no visible nonferrous metal particle. Alternatively, the crumb rubber contains no more than about 0.01% ferrous metal particles by weight. The particles of the crumb rubber may be any size suitable for dispersing in the asphalt-coated crumb rubber composition. In some embodiments, the particles of crumb rubber have a mean diameter from about 75 µm to about 650 µm. Alternatively, the crumb rubber may be from about 80 mesh to about 600 mesh, from about 100 to about 600 mesh, from about 20 to about 200 mesh, about 140 mesh (e.g. about 75 µm to about 100 µm) or about 150 mesh. In one non-limiting example, the crumb rubber is from about 100 mesh to about 600 mesh derived from MICRO-VULK GTR, available from PrimePlex, LLC. The amount of the crumb rubber may vary depending upon the circumstances. For example, the crumb rubber may be at least about 15% (w/w), such as from about 15% (w/w) to about 30% (w/w) from about 20% (w/w) to about 40% (w/w), or from about 25% (w/w) to about 35% (w/w) of all non-volatile components of the emulsion of an emulsion of an asphalt-rubber binder.

A functional vegetable oil derivative is a derivative of a vegetable oil or other fatty substance, or a substance having a similar composition regardless of the origin of the substance. In some embodiments, the functional vegetable oil derivative is epoxidized unsaturated triglyceride. Epoxidized unsaturated triglyceride is a tri-ester of glycerine. The glycerine bonds to three linear or branched carboxylic acids, wherein at least one of the carboxylic acids comprises an epoxide moiety. For example, the epoxidized unsaturated triglyceride may be a derivative of an unsaturated fatty acid triglyceride such as a vegetable or animal fat or oil, wherein at least one of the C=C moieties of the parent unsaturated fatty acid triglyceride is replaced with an epoxide moiety (i.e. a three-membered ring containing an oxygen). If the parent unsaturated fatty acid triglyceride has more than one C=C moiety, one, part, or all of the C=C moieties may be replaced by epoxide moieties. Examples of vegetable or animal fats or oils include coconut oil, corn oil, cottonseed oil, olive oil, palm oil, peanut oil, rapeseed oil, canola oil, safflower oil, sesame oil, soybean oil, sunflower oil, castor oil, tallow oil, and the like. In one embodiment, the vegetable oil is soybean oil.

A solvent dispersed wood rosin ester may be used in addition to, or as an alternative to the functional vegetable oil derivative or epoxidized unsaturated triglyceride. Common solvents for dispersing the wood rosin ester include organic solvents such as hydrocarbons, including mineral spirits, toluene, xylene, and naptha solvent (e.g. VM&P).

The amount of the ammendment, such as an epoxidized saturated triglyceride, may vary depending upon the circumstances. For example, an ammendment, such as an epoxidized unsaturated triglyceride, may be from about 1% (w/w) to about 10% (w/w), from about 2% (w/w) to about 6% (w/w), or about 4% (w/w) of the asphalt-coated crumb rubber composition.

The surfactant of the asphalt-coated crumb rubber composition may be any surfactant, including any of the possibilities described above. In some embodiments, the surfactant comprises a cationic or a nonionic surfactant. In other embodiments, the surfactant comprises a nitrogen-containing surfactant such as a fatty amine or a nitrogen-containing cationic surfactant such as an amine surfactant in the ammonium salt form.

The amount of the surfactant may vary depending upon the circumstances. For example, the surfactant may be from about 0.1% (w/w) to about 10% (w/w), from about 1% (w/w), to about 4% (w/w), or from about 1.5% (w/w) to about 3% (w/w) of the asphalt-coated crumb rubber composition.

The amount of water in the asphalt-coated crumb rubber composition may vary depending upon the circumstances. For example, the water may be about from about 1% (w/w) to about 10% (w/w), from about 2% (w/w), to about 6% (w/w), or about 4% (w/w) of the asphalt-coated crumb rubber composition. For some applications, such as those which involve the laying of asphalt pavement at ambient temperatures, a reduced amount of water may be desirable. For examples, in some asphalt-coated crumb rubber compositions, essentially no water is added, or alternatively, the water content of the composition is about 2% (w/w) or less, such as about 0.00001% (w/w) to about 2% (w/w), about 0.00001% (w/w) to about 1% (w/w), or about 0.00001% (w/w) to about 0.5% (w/w). Preferably, the asphalt-coated crumb rubber composition is prepared by heating crumb rubber and asphalt together until the crumb rubber swells or reacts. The temperature of the heating may be any convenient temperature, such as from about 250° F. to about 450° F., from about 300° F. to about 400° F., or about 350° F. The heating may occur for any amount of time depending upon the circumstances. In some embodiments, the heating is carried out from about 5 minutes to about 90 minutes, from about 10 minutes to about 60 minutes, or about 15 minutes. The heating may result in a range of viscosities for the asphalt-crumb rubber combination. Preferably, the viscosity is from about 500 cps to about 3000 cps; from about 700 cps to about 2000 cps; or from about 900 cps to about 1500 cps.

While not intending to be limiting, the epoxidized unsaturated triglyceride may be added and mixed into the asphalt-crumb rubber combination after the crumb rubber swells. The mixing may occur at any temperature. For example, the mixture may be thoroughly blended at a temperature of: from about 100° F. to about 300° F., from about 150° F. to about 250° F., or about 200° F.

In some embodiments, the water and the surfactants are mixed separately from the asphalt-crumb rubber blend until the surfactant is dissolved. The surfactant solution is then mixed into the asphalt-crumb rubber blend prepared above. In some preferred embodiments, the surfactants are added directly to the asphalt-crumb rubber blend without being dissolved in water.

In some embodiments, a lower or no water content in the asphalt-coated crumb rubber composition may result in an asphalt pavement which may cure more rapidly. For example, a road made from the asphalt pavement may be opened to traffic sooner after the asphalt pavement is laid. It should be noted, however, that for preferred embodiments, once the asphalt-coated crumb rubber composition is prepared, for example, after the crumb rubber has swelled or reacted in the presence of the asphalt, the asphalt-coated crumb rubber composition may be mixed with waterborne compounds, such as water in any emulsion composition described herein, without substantially slowing the curing time as compared to that of the original emulsion.

First Asphalt Emulsion

The first asphalt compositions may comprise a first asphalt, a surfactant, and water. In some embodiments, the first asphalt may be harder than the second asphalt. For example, the first asphalt may have a pen value in the range of about 0 dmm to about 100 dmm. If a first asphalt composition is a hard asphalt emulsion, such as Emulsion H 110 in FIG. 2, the asphalt may be a hard asphalt. Hard asphalt is asphalt which is substantially harder than that normally used in roads. For example, the hard asphalt may have a penetration value of from about 0 dmm to about 50 dmm, or alternatively, about 0 dmm to about 10 dmm. In other embodiments, the hard asphalt has a ring and ball softening point of from about 155° F. to about 165° F. In terms of chemical composition, the hard asphalt may comprise hydrocarbons having at least 24 carbon atoms. For example, the hydrocarbon portion of the hard asphalt may consist essentially of $C_{24-500}$ hydrocarbons.

The amount of the first asphalt may vary depending upon the circumstances. In some embodiments, the first asphalt is from about 40% (w/w) to about 80% (w/w); from about 50% (w/w) to about 70% (w/w); or about 60% (w/w); of first hard asphalt emulsion.

The first surfactant, or the surfactant of the first asphalt emulsion, may be any surfactant, including any of the possibilities described above. In some embodiments, the first surfactant comprises a cationic or a nonionic surfactant. For example, the surfactant may comprise one or more of: a nitrogen-containing surfactant such as a fatty amine; a nitrogen-containing cationic surfactant such as an amine surfactant in the ammonium salt form; an amido amine surfactant, an ammonium salt thereof, or a combination thereof; and a lignin amine surfactant, i.e. lignin combined with an amine. In some embodiments, the first surfactant comprises an amine or an ammonium functional group.

The amount of the surfactant may vary depending upon the circumstances. In some embodiments, the surfactant is from about 0.1% (w/w) to about 10% (w/w), from about 1% (w/w) to about 5% (w/w), or about 2% (w/w) of the first asphalt emulsion.

The amount of water in the first asphalt emulsion may vary depending upon the circumstances. For example, the water may be from about 25% (w/w) to about 80% (w/w), from about 30% (w/w) to about 50% (w/w), or from about 30% (w/w) to about 40% (w/w) of the first asphalt emulsion.

In some embodiments, the first asphalt emulsion is prepared by heating the hard asphalt in a separate vessel before mixing with the other components of the first asphalt emulsion. The heating may be at any temperature sufficient to soften the asphalt for mixing such as: from about 300° F. to about 400° F., or about 325° F.

The water and the surfactants may be mixed separately until the surfactant is dissolved to form a soap solution. The soap solution may then be combined with the heated first asphalt and run through a colloid mill. Examples of suitable high shear colloid mills include, but are not limited to, Dahlworth, Superton, or Charlotte high shear colloid mills.

The combination of the hot asphalt and cold soap may result in a mixing temperature below the boiling point of water, such as from about 180° F. to about 210° F., or from about 190° F. to about 200° F. Continued mixing in the high shear colloid mill may produce an emulsion in which the oil droplets are suspended in water Soft Asphalt Emulsion If a method relates to a soft asphalt emulsion, the soft asphalt emulsion may comprise soft asphalt, a surfactant; and water. In other embodiments, the soft asphalt emulsion further comprises an ammendment such as an unsaturated carboxylic acid such as an olefin from the stearol family.

Soft asphalt is asphalt which substantially softer than that normally used in roads. For example, the soft asphalt may have a penetration value greater than about 200 dmm. The soft asphalt may also be characterized as having a ring and ball softening point of from about 60° F. to about 85° F. With regard to chemical composition, the soft asphalt may comprise $C_{2-8}$ hydrocarbons. For example, the hydrocarbon portion of the asphalt may consist essentially of $C_{2-8}$ hydrocarbons.

The amount of the soft asphalt may vary depending upon the circumstances. For example, the soft asphalt may be from about 40% (w/w) to about 80% (w/w), from about 50% (w/w) to about 70% (w/w), or about 60% (w/w) of the soft asphalt emulsion.

Any unsaturated carboxylic acid may be used in the soft asphalt emulsion. In some embodiments, the unsaturated carboxylic acid comprises a $C_{6-30}$ carboxylic acid, including but not limited to, linear and branched carboxylic acids, which include fatty acids or olefins from the stearol family such as arachidonic acid, eicosapentaenoic acid, linoleic acid, α-linolenic acid, γ-linolenic acid, oleic acid, palmitoleic acid, and combinations thereof.

The amount of the unsaturated carboxylic acid may vary depending upon the circumstances. For example, the unsaturated carboxylic acid may be from about 0.1% (w/w) to about 5% (w/w), from about 0.5% (w/w) to about 2% (w/w), or from about 1% (w/w) to about 1.5% (w/w) of the soft asphalt emulsion.

The surfactant of the soft asphalt emulsion may be any surfactant, including any of the possibilities described above. In some embodiments, the surfactant comprises a cationic or a nonionic surfactant. For example, the surfactant may comprise one or more of: a nitrogen-containing surfactant, such as a surfactant comprising an amine or an ammonium functional group, such as a fatty amine; a nitrogen-containing cationic surfactant such as an amine surfactant in the ammonium salt form; an amido amine surfactant; and a lignin amine surfactant, i.e. lignin combined with an amine.

The amount of the surfactant may vary depending upon the circumstances. In some embodiments, the surfactant is from about 0.1% (w/w) to about 10% (w/w); from about 1% (w/w) to about 5% (w/w); or about 2% (w/w) of the soft asphalt emulsion.

The amount of water in the soft asphalt emulsion may vary depending upon the circumstances. For example, the water may be from about 10% (w/w) to about 80% (w/w), from about 20% (w/w) to about 50% (w/w), or from about 30% (w/w) to about 40% (w/w) of the soft asphalt emulsion.

The soft asphalt emulsion may further comprise an optionally substituted styrene butadiene styrene block copolymer (SBS). SBS is a block copolymer comprising an optionally alkyl substituted polybutadiene chain which is attached to two distinct, independent optionally substituted polystyrene chains, one on each end of the polybutadiene. An optionally substituted polybutadiene chain is a polymeric chain formed from a butadiene which may be unsubstituted, or all or wherein part of the monomers used to form the chain comprise one or more $C_{1-5}$ alkyl groups corresponding to any position on the monomer. An optionally substituted polystyrene is a polymeric chain formed from a styrene which may be unsubstituted, or wherein all or part of the monomers used to form the chain comprise one or more $C_{1-5}$ alkyl groups corresponding to any position on the monomer.

In other embodiments, one or more of the polystyrene chains and the polybutadiene chain may have guest monomeric units up to about 5%, about 10%, or about 50% of the total monomeric content. A guest monomeric unit is a monomer that is not an optionally substituted styrene which is incorporated into one or both of the optionally substituted polystyrene chains, or a monomer that is not an optionally substituted butadiene which is incorporated into the polybutadiene chain or is incorporated into a branching or a radially branching group. Examples of guest monomers include optionally substituted ethylenes, optionally substituted acrylates, and the like. In some embodiments, the SBS may be branched. In other embodiments, the SBS may be radially branched.

The amount of SBS in the soft asphalt emulsion may vary depending upon the circumstances. In some embodiments, the SBS is from about 0.1% (w/w) to about 10% (w/w), from about 1% (w/w) to about 5% (w/w), or about 2% (w/w) of the soft asphalt emulsion.

In other embodiments, the SBS is crosslinked. Crosslinking may be carried out using any of the many crosslinkers known in the art, as described above. The amount of crosslinker in the soft asphalt emulsion may vary depending upon the circumstances. In some embodiments, the crosslinker is from about 0.0001% (w/w) to about 1% (w/w), from about 0.005% (w/w) to about 0.2% (w/w), or about 0.08% (w/w) of the soft asphalt emulsion.

The soft asphalt emulsion may be prepared by a number of different methods. For example, the soft asphalt may be mixed with the unsaturated fatty acid at an elevated temperature to form a soft asphalt-fatty acid composition. The mixing may occur at any elevated temperature useful to provide adequate mixing. In some embodiments, the mixing temperature is from about 200° F. to about 450° F., from about 300° F. to about 400° F., or about 325° F. In a preferred embodiment, a combination of water and one or more surfactants are thoroughly mixed, and this surfactant liquid is then combined with the soft asphalt-fatty acid combination to provide a soft asphalt emulsion.

The mixing of the water and surfactant may be done at any temperature that allows such mixing. In some embodiments, the mixing is done at from about 32° F. to about 150° F., about 70° F. to about 90° F., or about 80° F.

The mixing of the surfactant liquid with the soft asphalt-fatty acid combination may be done at any temperature that allows adequate mixing. In some embodiments, the mixing is done with the soft asphalt-fatty acid combination having a temperature of from about 200° F. to about 450° F., or from about 280° F. to about 350° F., preferably about 300° F., and the water/surfactant combination, or soap system, having a temperature of from about 32° F. to about 150° F., or about 70° F. to about 110° F., preferably about 80° F. Once the heat is transferred from the warmer materials to the cooler materials, the temperature may be about 180° F. to about 210° F. as mixing continues.

The optionally substituted SBS is preferably added to the asphalt or the asphalt-fatty acid composition and mixed until the SBS is dissolved to provide a polymer modified soft asphalt. The polymer modified soft asphalt may be combined with the surfactant liquid in the same manner as the asphalt-fatty acid composition to provide other embodiments of the soft asphalt emulsion.

In other embodiments, a crosslinker is added to the polymer modified soft asphalt emulsion and mixed to provide, upon condensation, a crosslinked polymer modified soft asphalt. The crosslinker may be mixed under suitable conditions which will allow the crosslinker to be properly dispersed.

EXAMPLE 1

Composition A

Crumb Rubber Concentrate

TABLE 1

Crumb Rubber Concentrate (Component #1)

| Element | Weight (lbs) | Solids | Comments |
|---|---|---|---|
| 1) Asphalt | 60.5 | 60.5 | Typically AC5 (90-200 pen; R&B = 85-100 F.) |
| Raise #1 to 350 F. then add #2 and mix for ~15 minutes | | | |
| 2) Crumb Rubber | 30.0 | 30.0 | Vulcanized ground scrap tire: 650-75 micron range: varies |
| Sub-total | 90.5 | 90.5 | |
| 3) Ammendment | 4.0 | 4.0 | Epoxidized soy oil or other functional vegetable oil derive. |
| Cool blend of #1 + #2 + #3 to ~200 F., then thoroughly blend | | | |
| Separately pre-blend #4 and # %, then add blend of #1-3 | | | |
| to achieve heavy mastic body consistency | | | |
| 4) 4819 | 1.5 | 1.2 | |
| 5) H₂O/Solvent | | | May contain small quantity of glycol ether or other solvent |
| Total | 96 | 95.7 | |

Table 1 summarizes one embodiment of the preparation of the crumb rubber concentrate. Asphalt (about 60.5 lbs, about 90-200 pen, ring and ball (R&B) softening temperature=about 85-100° F.) is heated to about 350° F. Crumb rubber (about 30 lbs, vulcanized ground scrap tire, about 650-75 micron range) is then added and the combination is mixed for about 15 minutes whereupon the crumb rubber swells and reacts in the asphalt medium to a viscosity range of about 900-1500 cps. Epoxidized soy oil is then added as ammendment (about 4 lbs), and the mixture is thoroughly blended at about 200° F.

Water (about 4 lbs) and a fatty amine surfactant (Azko Nobel Readicote 4819, about 1.5 lbs) are mixed separately until the surfactant is dissolved. This surfactant solution is then mixed into the asphalt-crumb rubber blend prepared above until a heavy mastic body consistency is achieved.

Composition B-Hard Pen Asphalt Emulsion

TABLE 2

Hard Pen Asphalt Emulsion (Compouent #2)

| Element | Weight (lbs) | Solids | Comments |
|---|---|---|---|
| 1) H20 | 36.50 | 0 | Potable |
| 2) ER 582 | 1.10 | 0.85 | P2 (Prime Plex) Surfactant - other options commercially available |
| 3 W-5 | 1.10 | 0.44 | Surfactant - Lignin Amine Meade Wesvaco Chemical |
| Sub-Total | 38.7 | 1.29 | |
| Pre-heat asphalt to 325° F. then co-mill with pre-blended 'soap' system | | | |
| (#1 + #2 + #3 @ 80° F.) through colloid mill | | | |
| 4) Asphalt | 61.30 | 61.30 | PDA or VTB or 'blown' (zero 10 pen: R&B = 155-165° F.) |
| Sub-Total | 100.00 | 62.59 | |

Table 2 summarizes one embodiment of the preparation of the hard pen asphalt emulsion. Asphalt (about 61.3 lb, about 0-10 pen, R&B=about 155-165° F.) is heated to about 325° F. in a separate vessel. The soap is separately prepared by dissolving or dispersing an amido amine surfactant (ER 582 surfactant, about 1.1 lbs, available from PrimePlex), and W-5 surfactant (about 1.1 lbs, lignin amine Meade Wesvaco Chemical) in water (about 36.5 lbs).

The asphalt and soap are pumped into a mixing chamber of a high shear colloid mill. The combination of the hot asphalt and cold soap results in a mixing temperature below 200° F. Continued mixing in the high shear colloid mill produces an emulsion in which the oil droplets are suspended in water

Composition C-Polymer Modified Asphalt Emulsion

TABLE 3

Soft Pen-Polymer Modified Asphalt Emulsion

| Element | Weight (lbs) | Solids (lbs) | Comments |
|---|---|---|---|
| 1) Asphalt | 58.00 | 58.00 | VTB-AC5 or blend (pen = 20+; R&B = 60-85° F.) |
| 2) Ammendment | 1.22 | 1.22 | Olefin from stearol family, e.g. oleic acid, amount varies |
| Pre-blend #1 + #2 at 325° F., then add #3 | | | |
| and run through high shear until dissolved. | | | |
| 3) SBS Elastomer | 2.00 | 2.00 | Radially branched, with crosslink functionality by sulfur compound |
| SubTotal | 61.22 | 61.22 | |
| 4) H2O | 36.58 | 0 | Potable |
| 5) ER582 | 1.10 | 0.85 | #4-7 are pre-blended soap system |
| 6) W-5 | 1.10 | 0.44 | |
| Subtotal | 38.78 | 1.29 | |
| Total | 100.0 | 62.59 | |

Table 3 summarizes one embodiment of the preparation of the polymer modified asphalt emulsion. Asphalt (about 58 lbs, about 200+ pen, R&B=about 60-85° F.) is combined with an unsaturated fatty acid ammendment (about 1.2 lbs) at about 325° F. and mixed until the composition is uniform throughout. Radially branched styrene butadiene styrene block copolymer (Kraton 1118, about 2 lbs), is then added, and the mixture is run through a high shear mixer until the polymer is dissolved, and the composition is mixed for at least about 8 hours at about 300° F.

A combination of water (about 36.5 lb) ER 582 (about 1.1 lb) and W-5 (about 1.1 lb) are thoroughly mixed at about 80° F. This is then co-milled with the cross-linked polymer modified asphalt at about 300° F.

Composition D-Asphalt Emulsion

TABLE 4

| Element | Weight (lbs) | Solids (lbs) | Comments |
|---|---|---|---|
| Composition B | 28.17 | 58.00 | Stir Composition B and Composition C, then add Mastic, Composition A, until fully homogeneous. |
| Composition C | 19.00 | 11.89 | |
| Composition A | 35.00 | 34.45 | |
| Crosslinker | 1.00 | 0.50 | SL4005 Resin from PrimePlex |
| Total | 100.00 | 75.01 | |

Table 4 summarizes one embodiment of the preparation of an asphalt-rubber binder emulsion which provides a minimum of about 15% crumb rubber based upon the total 'neat' binder weight per ASTM Standard D8-02. Composition B (about 45 wt %) and composition C (about 19 wt %) are thoroughly blended, and composition A (about 35 wt %) is added under high speed shear until the mixture is fully homogeneous.

EXAMPLE 2

The procedure of Example 1 is carried out except that the preparation of Composition A—Crumb rubber concentrate, is modified as follows.

Composition A-Crumb Rubber Concentrate

TABLE 5

Crumb Rubber Concentrate (Component #1)

| Element | Weight (lbs) | Solids | Comments |
|---|---|---|---|
| 1) Asphalt | 60.5 | 60.5 | Typically AC5 (90-200 pen; R&B = 85-100 F.) |
| Raise #1 to 350 F. then add #2 and mix for ~15 minutes | | | |
| 2) Crumb Rubber | 30.0 | 30.0 | |
| Sub-total | 90.5 | 90.5 | |
| 3) Ammendment | 4.0 | 4.0 | Epoxidized soy oil or other functional vegetable oil derive. |
| Cool blend of #1 + #2 + #3 to ~200 F., then thoroughly blend #4 to achieve heavy mastic body consistency | | | |
| 4) 4819 | 1.5 | 1.2 | |
| Total | 96 | 95.7 | |

Table 5 summarizes one embodiment of the preparation of the crumb rubber concentrate. Asphalt (about 60.5 lbs, about 90-200 pen, ring and ball (R&B) softening temperature=about 85-100° F.) is heated to about 350° F. Crumb rubber (about 30 lbs, vulcanized ground scrap tire, about 650-75 micron range) is then added and the combination is mixed for about 15 minutes whereupon the crumb rubber swells and reacts in the asphalt medium to a viscosity range of about 900-1500 cps. Epoxidized soy oil is then added as ammendment (about 4 lbs), and the mixture is thoroughly blended at about 200° F. A fatty amine surfactant (Azko Nobel Readicote 4819, about 1.5 lbs) is then mixed into the asphalt-crumb rubber blend until a heavy mastic body consistency is achieved.

EXAMPLE 3

Composition B (about 45 wt %) and composition C (about 20 wt %) are thoroughly blended, composition A (about 35 wt %) is then added under high speed shear until the mixture is fully homogeneous. Finally, a crosslinker is added (1.0% Polycup® 4500 polymeric resin, as described in the product data sheet, available from PrimePlex, LLC).

EXAMPLE 4

Street and Highway Safety Seal

A crumb rubber concentrate is prepared as described in Example 2. The crumb rubber employed is a finely ground tire (80-140 mesh). A cationic emulsion is then prepared having a pH of about 2.5 to about 4.5 using the crumb rubber concentrate as described in Example 1 or Example 2. The emulsion is formulated to have about 50% to about 55% solids by distillation, about 15% to about 22% ground tire rubber, and have an viscosity of less than about 100 seconds.

The emulsion thus prepared is diluted by about 50% and sprayed on street or highway asphalt pavement at spread rates of about 0.10 gal/sq. yd.

The skid coefficient (per ASTM E274-06) and the wet surface locked wheel stopping distance of a treated road is compared to the skid coefficient of an untreated road for smooth round stone aged pavement, angular aged pavement, and new pavement. In every case, the skid coefficient and the stopping distance was significantly better for the treated pavement.

EXAMPLE 5

Street and Highway Safety Seal

The procedure of Example 3 is carried out except that a range of crushed aggregates were added to the emulsion. Up to 5 lbs/gal (of concentrated binder) are used. This will further improve skid coefficient, stopping distance, and other indicators of road performance.

EXAMPLE 6

Parking Lot Seal

A crumb rubber concentrate is prepared as described in Example 2. The crumb rubber employed is a finely ground tire (80-140 mesh). A cationic emulsion is then prepared having a pH of about 2.5 to about 4.5 using the crumb rubber concentrate as described in Example 1 or Example 2. The emulsion is formulated to have about 50% to about 65% solids by distillation, about 4% to about 12% ground tire rubber, and have an viscosity of less than about 100 seconds.

The emulsion thus prepared is diluted by about 25% to about 40% and sprayed or spread on parking lot asphalt pavement at spread rates of about 0.15 gal/yd$^2$ to about 0.30 gal/yd$^2$.

EXAMPLE 7

Base Asphalt Emulsion Formula

Asphalt (about 118 lb, about 0-10 pen, R&B=about 155-165° F.) is heated to about 325° F. in a separate vessel. A soap is separately prepared by dissolving or dispersing an amido amine surfactant (ER 582 surfactant, about 2 lbs, available from PrimePlex) in water (about 80 lbs). The asphalt and soap are pumped into a mixing chamber of a high shear colloid mill. The combination of the hot asphalt and cold soap results in a mixing temperature below 200° F. Continued mixing in the high shear colloid mill produces an emulsion in which the oil droplets are suspended in water. Hydrochloric acid (about 0.6 lbs) is then mixed into the composition to bring the pH to about 2.

EXAMPLE 8

Hydrophilicized Asphalt-Coated Crumb Rubber

Asphalt (about 30 lbs, about 90-200 pen, ring and ball (R&B) softening temperature=about 85-100° F.) is heated to about 350° F. and mixed with a carboxyfunctional blend of stearic acid, oleic acid, and palmitic acid (10/60/30 w/w/w; about 20 lbs), and a fatty amine surfactant (about 0.6 lbs RediCoat 4819, from Akzo Chemical). Part of this mixture (about 25 lbs) is then sprayed onto the surface of the crumb rubber (about 75 lbs) by means of a Thermal Turbo Integrator, as supplied by PrimePlex, LLC.

The base asphalt emulsion formula (about 4 parts by weight) is then blended with the hydrophilicized asphalt-coated rubber (about 1 part by weight) to provide an emulsion of asphalt rubber binder wherein the crumb rubber is about 22 percent of the weight of the non-volatile components of the emulsion.

EXAMPLE 8

Mastic

A mixture of wood rosin (3.5 lbs), mineral spirits (3.5 lbs), and a surfactant (1.4 lbs RediCoat E-7000 available from Akzo Chemical) are mixed with asphalt (about 60.9 lbs, about 150-200 pen, ring and ball (R&B) softening temperature=about 85-100° F.) at about 350° F. A fatty amine surfactant (about 0.7 lbs RediCoat 4819, from Akzo Chemical) and ground tire rubber (about 30 lbs, 80 mesh) are blended into the mixture under high shear to provide a mastic having 87% non-volatile components and about 30% ground tire rubber by weight.

The mastic (25 lbs) is combined with the base asphalt emulsion formula (15 lbs) and water (2.5 lbs) under high shear to provide an emulsion of asphalt rubber binder having about 16% ground tire rubber based upon the weight of the non-volatile components of the emulsion.

While the above detail description has shown, described, and pointed out novel features of the invention as applied to various embodiments, it will be understood that various omissions, substitutions, and changes in the form and details of the systems, methods, processes, or compositions illustrated may be made by those skilled in the art without departing from the spirit of the invention. As will be recognized, the present invention may be embodied within a form that does not provide all of the features and benefits set forth herein, as some features may be used or practiced separated from others.

What is claimed is:

1. An emulsion of an asphalt-rubber binder comprising:
   a mixture of a first asphalt emulsion and swelled asphalt-coated crumb rubber particles,
   wherein the first asphalt emulsion comprises a first asphalt mixed with water and a surfactant, wherein the first asphalt has a pen value of about 0 dmm to about 50 dmm and wherein the surfactant is selected from the group consisting of amines, ammonium salts, amidoamines, imidazolines, imidoamincs, imines, amides, imadazoles, imidazolencs, and combinations thereof,
   wherein the swelled asphalt-coated crumb rubber particles comprise crumb rubber particles having a diameter of from 75-650 microns and being coated and swelled by a second asphalt at a temperature of 325° F. to about 375° F., wherein the second asphalt has a pen value of about 90 dmm to about 200 dmm, and wherein the crumb rubber particles and the second asphalt yield a mixture having a viscosity in a range of from about 900 cps to about 1500 cps;
   wherein the swelled asphalt-coated crumb rubber particles are substantially homogenized into first asphalt droplets of the first asphalt emulsion, forming a smooth and uniform emulsion of an asphalt-rubber binder, wherein the smooth and uniform emulsion of the asphalt-rubber binder comprises about 15% to about 30% crumb rubber based upon a total weight of all non-volatile components of the smooth and uniform emulsion, and wherein the smooth and uniform emulsion is stable at a pH below about 7.

2. The emulsion of claim 1, wherein the swelled asphalt-coated crumb rubber particles further comprise oleic acid.

3. The emulsion of claim 1, wherein the surfactant is a fatty amine surfactant, an ammonium salt thereof, or a combination thereof.

4. The emulsion of claim 1, wherein the crumb rubber particles are about 60% to about 90% the total weight of all non-volatile components of the swelled asphalt-coated crumb rubber particles.

5. The emulsion of claim 1, wherein the crumb rubber particles are about 20% to about 40% the total weight of all non-volatile components of the swelled asphalt-coated crumb rubber particles.

6. The emulsion of claim 1, wherein the swelled asphalt-coated crumb rubber particles further comprise wood rosin, naphtha, or a combination thereof.

7. The emulsion of claim 1, further comprising a second asphalt emulsion, the second asphalt emulsion comprising a third asphalt having a pen value in the range about 200 dmm to about 300 dmm mixed with a polymer to provide a polymer modified asphalt, wherein the polymer modified asphalt is mixed with water and a surfactant selected from the group consisting of amines, ammonium salts, amidoamines, imidazolines, iridosmines, imines, amides, imadazoles, imidazolenes, and combinations thereof, and wherein the second asphalt emulsion is mixed with at least one of the first asphalt emulsion, the swelled asphalt-coated crumb rubber particles, and the emulsion of the asphalt-rubber binder.

8. The emulsion of claim 1, wherein the second asphalt comprises $C_{8-24}$ hydrocarbons and the first asphalt comprises $C_{24-500}$ hydrocarbons.

9. The emulsion of claim 1, wherein the second asphalt consists essentially of $C_{8-24}$ hydrocarbons and the first asphalt consists essentially of $C_{24-500}$ hydrocarbons.

10. The emulsion of claim 1, wherein the swelled asphalt-coated crumb rubber particles further comprise an epoxidized soy oil.

11. The emulsion of claim 1, further comprising an epoxidized unsaturated triglyceride.

12. The emulsion of claim 1, wherein the crumb rubber is vulcanized ground scrap tire.

13. The emulsion of claim 1, further comprising lignin, and wherein the surfactant is a fatty amine surfactant.

14. The emulsion of claim 1, wherein the first asphalt has a pen value of from about 0 dmm to about 30 dmm, wherein the surfactant is an amido amine surfactant, an ammonium salt thereof, or a combination thereof, and wherein water represents about 30% to about 50% of the weight of the emulsion.

15. An asphalt pavement comprising the emulsion of claim 1 in cured form, wherein, upon curing, the smooth and uniform emulsion of the asphalt-rubber binder exhibits physical properties equivalent to those of the asphalt-rubber binder prepared pursuant to ASTM D6114-97 (2002) specifications.

* * * * *

UNITED STATES PATENT AND TRADEMARK OFFICE
CERTIFICATE OF CORRECTION

| | |
|---|---|
| PATENT NO. | : 8,926,742 B2 |
| APPLICATION NO. | : 14/335808 |
| DATED | : January 6, 2015 |
| INVENTOR(S) | : William B. Coe |

It is certified that error appears in the above-identified patent and that said Letters Patent is hereby corrected as shown below:

Title page, (item 60, Related U.S. Application Data) at line 2, After "Provisional application No. 61/141,389, filed Dec. 30, 2008." insert --Provisional application No. 61/142,847, filed Jan. 6, 2009.--

Title page, (item 74, Attorney, Agent, or Firm) at line 1, After "Bear" insert --LLP--.

Title page, (item 57, Abstract) at line 3, Change "ASTM D80-02" to --ASTM D8-02--.

In the Specification

In column 1 at line 13 (approx.), Change "60/141,389," to --61/141,389,--.

In column 2 at line 32, Change "40 F" to --40°F--.

In column 3 at line 65, Change "or and" to --or/and--.

In column 4 at lines 56-57, Change "or and" to --or/and--.

In column 8 at line 32, Change "ammendment" to --amendment--.

In column 8 at lines 35-36, Change "ammendment," to --amendment,--.

In column 8 at line 37, Change "ammendment" to --amendment--.

In column 9 at line 19, Change "ammendment" to --amendment--.

In column 9 at line 38, Change "Emusion" to --Emulsion--.

In column 9 at line 47, Change "Emusion" to --Emulsion--.

In column 10 at line 58, Change "imadazoles," to --imidazoles,--.

In column 11 at line 13, Change "imadazoles," to --imidazoles,--.

In column 11 at line 34, Change ""ammendment"" to --"amendment"--.

In column 13 at line 47, Change "ammendment" to --amendment--.

In column 14 at line 49, Change "naptha" to --naphtha--.

In column 14 at line 50, Change "ammendment," to --amendment,--.

Signed and Sealed this
Twenty-fifth Day of August, 2015

Michelle K. Lee
*Director of the United States Patent and Trademark Office*

CERTIFICATE OF CORRECTION (continued)

U.S. Pat. No. 8,926,742 B2

In column 14 at line 52, Change "ammendment," to --amendment,--.

In column 16 at lines 45-46, Change "Dahlworth," to --Dalworth,--.

In column 16 at line 52, Change "water" to --water.--.

In column 16 at line 57, Change "ammendment" to --amendment--.

In column 19 at line 20 (approx.), Change "Ammendment" to --Amendment--.

In column 19 at line 20 (approx.), Change "#%," to --#5,--.

In column 19 at line 37 (approx.), Change "ammendment" to --amendment--.

In column 19 at lines 39-40 (approx.), Change "(Azko Nobel Readicote" to --(Akzo Nobel Redicote--.

In column 19 at line 50 (approx.), Change "(Compouent#2)" to --(Component#2)--.

In column 19 at lines 57-58 (approx.), Change "Meade Wesvaco" to --Mead Westvaco--.

In column 20 at line 11 (approx.), Change "water" to --water.--.

In column 20 at line 23 (approx., including Table), Change "Ammendment" to --Amendment--.

In column 20 at line 40, Change "ammendment" to --amendment--.

In column 21 at line 30 (approx.), Change "Ammendment" to --Amendment--.

In column 21 at line 46 (approx.), Change "ammendment" to --amendment--.

In column 21 at lines 47-48 (approx.), Change "(Azko Nobel Readicote" to --(Akzo Nobel Redicote--.

In column 22 at line 67, Change "carboxyfunctional" to --carboxylfunctional--.

In column 23 at line 3, Change "RediCoat" to --RediCote--.

In column 23 at line 19 (approx.), Change "RediCoat" to --RediCote--.

In column 23 at line 23 (approx.), Change "RediCoat" to --RediCote--.

In the Claims

In column 23 at line 52 (approx.), In Claim 1, change "imidoamincs," to --imidoamines,--.

In column 23 at lines 52-53 (approx.), In Claim 1, change "imadazoles," to --imidazoles,--.

In column 23 at lines 52-53 (approx.), In Claim 1, change "imidazolencs," to --imidazolenes,--.

In column 24 at line 28 (approx.), In Claim 7, after "range" insert --of--.

In column 24 at line 33 (approx.), In Claim 7, change "iridosmines," to --imidoamines,--.

In column 24 at line 33 (approx.), In Claim 7, change "imadazoles," to --imidazoles,--.